United States Patent
Jaurigue

(10) Patent No.: US 6,318,788 B1
(45) Date of Patent: Nov. 20, 2001

(54) MOTORIZED AUTOMOBILE SUNSHADE

(76) Inventor: Pedro M. Jaurigue, 124 N. Morada Ave., West Covina, CA (US) 91790

(*) Notice: Subject to any disclaimer, the term of this patent is extended or adjusted under 35 U.S.C. 154(b) by 0 days.

(21) Appl. No.: 09/518,730

(22) Filed: Mar. 3, 2000

Related U.S. Application Data

(60) Provisional application No. 60/123,315, filed on Mar. 5, 1999.

(51) Int. Cl.[7] .................................................... B60J 3/00
(52) U.S. Cl. .................... 296/97.4; 296/97.5; 296/97.8
(58) Field of Search .................... 296/97.4, 97.7, 296/97.8, 97.5, 37.7, 140; 160/370.2, 35, 84.1

(56) References Cited

U.S. PATENT DOCUMENTS

| | | | | |
|---|---|---|---|---|
| 3,069,198 | * | 12/1962 | Winn | 296/97.8 |
| 5,064,239 | * | 11/1991 | Folcik | 296/97.7 |
| 5,076,633 | * | 12/1991 | Hsu et al. | 296/97.4 |
| 5,201,563 | * | 4/1993 | Liao | 296/97.4 |
| 5,551,744 | * | 9/1996 | Liao | 296/97.4 |
| 5,560,668 | * | 10/1996 | Li | 296/97.8 |
| 5,653,278 | * | 8/1997 | Cheng | 160/370.22 |
| 5,720,508 | * | 2/1998 | Mohammed | 296/97.4 |
| 5,746,469 | * | 5/1998 | Nonaka | 296/97.7 |
| 5,751,488 | * | 5/1998 | Wade | 296/97.4 |
| 5,791,721 | * | 8/1998 | Lin | 296/97.8 |
| 5,875,829 | * | 3/1999 | Chou | 160/319 |
| 5,887,939 | * | 3/1999 | Yamaguchi et al. | 296/37.7 X |
| 5,947,544 | * | 9/1999 | Hubeshi | 296/97.4 |
| 6,095,231 | * | 8/2000 | Hahn | 160/370.22 |

* cited by examiner

Primary Examiner—Stephen T. Gordon
Assistant Examiner—Lori L. Coletta
(74) Attorney, Agent, or Firm—Goldstein Law Offices P.C.

(57) ABSTRACT

A motorized sunshade for selectively raising and lowering a sun screen on the windshield of an automobile. The sunshade comprises a battery-operated motor that is mounted with a sun screen, wherein the sun screen may be lowered or raised with respect to the windshield by actuating the motor. A pair of tracks are provided to secure the sun screen flush against the windshield.

5 Claims, 2 Drawing Sheets

MOTORIZED AUTOMOBILE SUNSHADE

CROSS REFERENCES AND RELATED SUBJECT MATTER

The invention relates to subject matter contained in provisional patent application Ser. No. 60/123,315, filed in the United States Patent Office on Mar. 5, 1999.

FIELD OF THE INVENTION

The invention relates to a motorized sunshade for use in an automobile. More specifically, the invention relates to a motorized sunshade which can selectively be used as a visor while driving and as a sun shield for blocking sun light when the automobile is parked in broad daylight.

BACKGROUND OF THE INVENTION

Impinging sun light has several adverse effects on automobiles. One adverse effect is the strain caused to the drivers and the passengers while driving. Other adverse effects from impinging sun light include the bleaching effect on the fabric of the automobile's interior as well as causing a glass-house effect, wherein the interior heats up to a level that is highly uncomfortable to human beings.

Some have suggested mechanisms to shade the automobile's interior from sun light. For example, U.S. Pat. No. 5,653,278 to Cheng discloses a windshield sunshade device that includes a base, a housing for containing a sunshade unit, two support arm units that can be folded in the housing and swung up to lift a shade curtain of the sunshade unit.

U.S. Pat. No. 5,201,563 to Liao discloses a windshield curtain control comprising a casing that holds a curtain that is extended out and hung between two opposite sides by a reversible motor that causes two opposite endless belts to rotate on rollers and pulleys.

U.S. Pat. No. 5,076,633 to Hsu et al. discloses an automatic sun screen that is capable of being automatically rolled up or released by actuation of a switch member.

While these prior art units may be suitable for the particular purpose employed, or for general use, they would not be as suitable for the purposes of the present invention as disclosed hereafter.

SUMMARY OF THE INVENTION

It is an object of the present invention to provide a battery operated apparatus for selectively raising and lowering a sun screen in front of a windshield of an automobile.

It is another object of the present invention to provide a sunshade that shades the entire windshield of the automobile, including the area around and extending downwardly therefrom.

It is a further object of the present invention to provide a sunshade having a rear view mirror.

In accordance with the present invention, the motorized sunshade comprises a housing that has a rotary motor mounted therein. A tinted sun screen extends downward from the housing, such that the sun screen is capable of covering most of the front windshield. A pair of tracks are provided on the sides of the windshield for guiding the sun screen to move parallel to the windshield. A rear view mirror is mounted to the housing so that the factory-installed rear view mirror may be removed from the windshield to allow usage of the motorized sunshade disclosed herein.

To the accomplishment of the above and related objects the invention may be embodied in the form illustrated in the accompanying drawings. Attention is called to the fact, however, that the drawings are illustrative only. Variations are contemplated as being part of the invention.

BRIEF DESCRIPTION OF THE DRAWINGS

The above and other aspects, features and advantages of the present invention will be more apparent from the following detailed description thereof, which is presented in conjunction with the following drawings, wherein corresponding reference characters indicate corresponding components throughout the drawing figures.

DETAILED DESCRIPTION OF THE PREFERRED EMBODIMENTS

Figure 1:
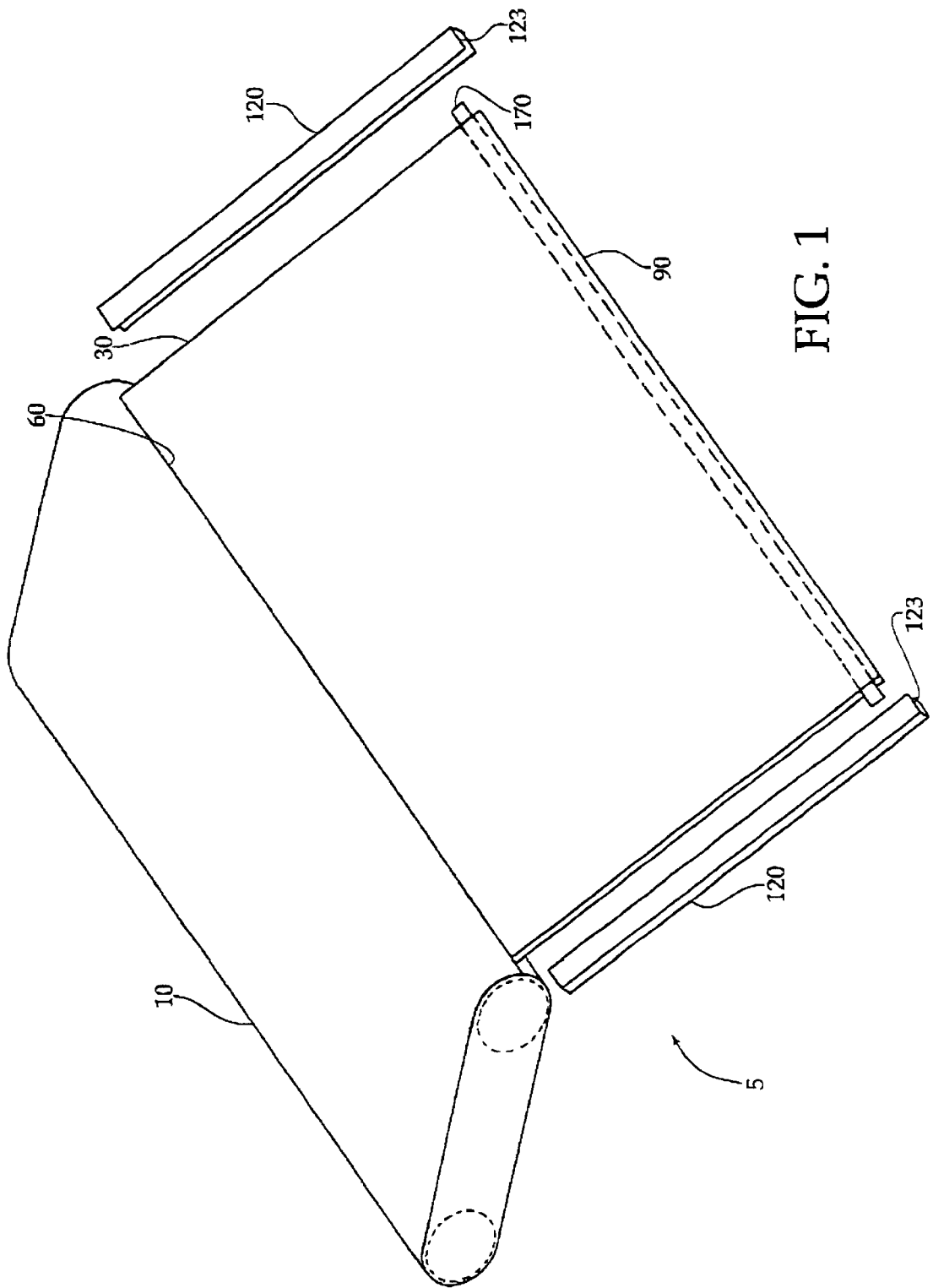
FIG. 1 is a diagrammatic perspective view of the sunshade, in accordance with the present invention.
Figure 2:
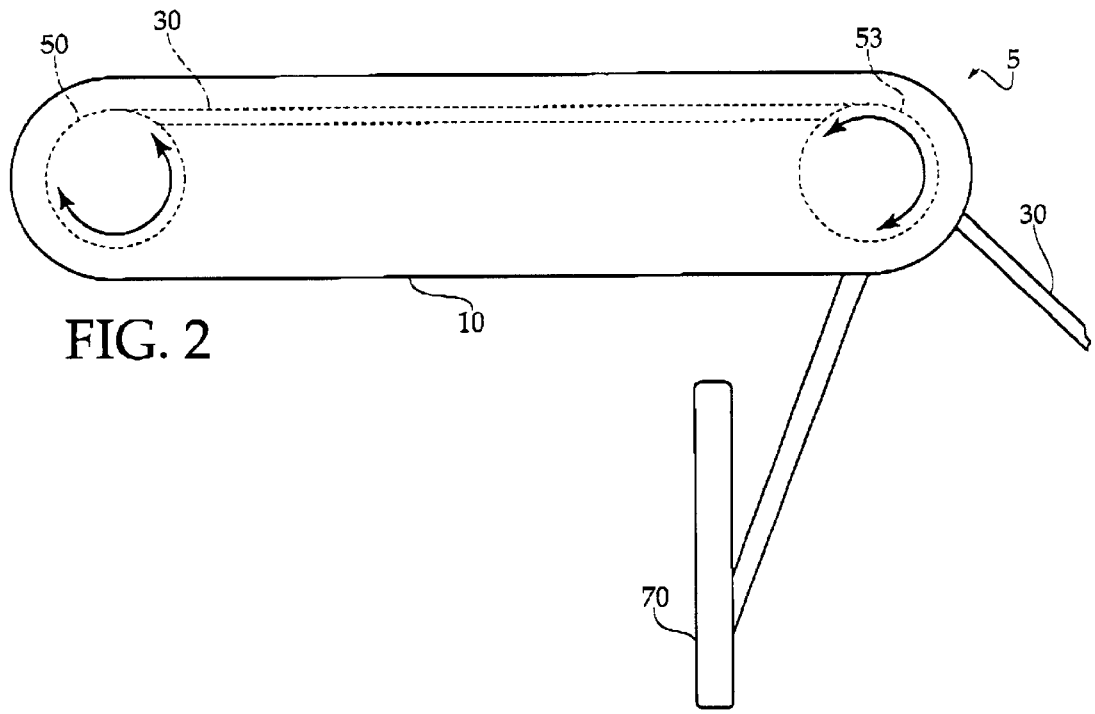
FIG. 2 is a side elevational view of the sunshade, showing a rear view mirror mounted to the housing.
Figure 3:
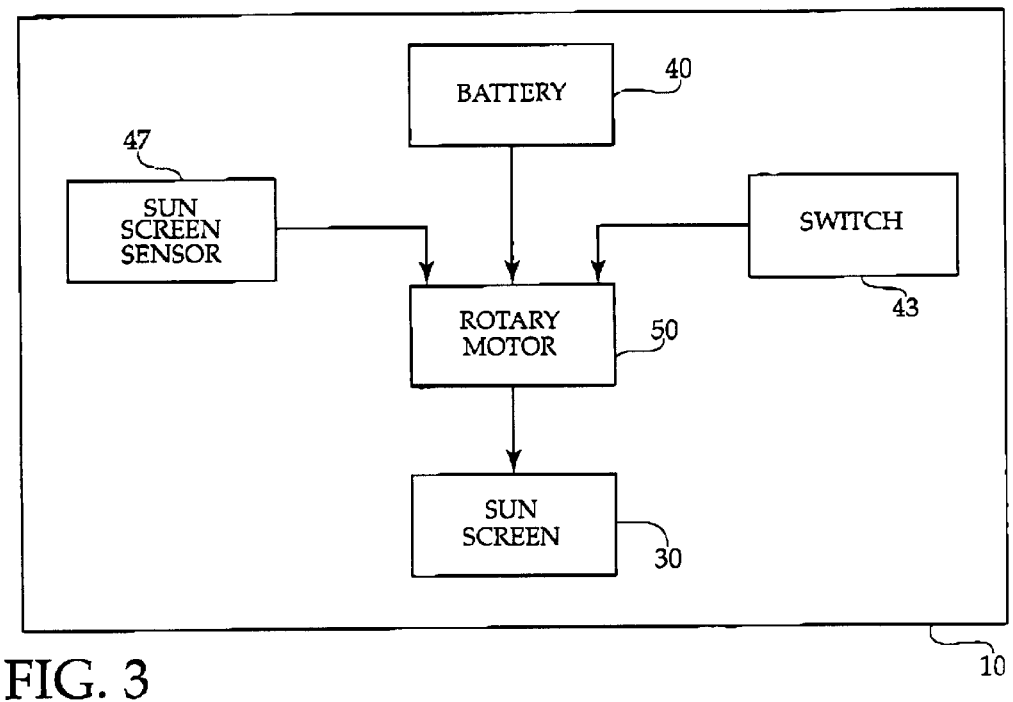
FIG. 3 is a block diagram of the circuit for operation of the motorized sunshade.

FIGS. 1–3 disclose a motorized sunshade 5 that is attached to a ceiling next to a windshield at the front of an automobile. The sunshade 5 is battery powered, and allows a user to selectively raise and lower a sun screen on the windshield to shield the interior from sun light.

As shown in FIG. 2, the sunshade 5 comprises a housing that is securely mounted to the ceiling of the automobile. A motor 50 and an idler 53 are mounted within the housing, wherein the motor 50 and the idler 53 rotate freely therein.

A sun screen 30 is linked to the motor 50 within the housing 10, wherein the sun screen 30 is selectively lowered onto the windshield or raised away therefrom. According to the invention, the sun screen 30 is lowered onto the windshield when the rotary motor 50 rotates clockwise and raised from the windshield when the rotary motor 50 rotates counter clockwise.

As shown in FIG. 1, the housing 10 has a slit 60 to allow the sun screen 30 to pass therethrough when the sun screen 30 is being lowered or raised with respect to the windshield. Motion by the sun screen 30 causes the idler 53, which contacts the sun screen 30 and which facilitates movement thereof.

A pair of elongated tracks 120 are securely mounted to the sides of the windshield. The tracks have an interior slot 123 that secure the sun screen 30 therein to ensure that the sun screen 30 lies flush against the windshield. The sun screen 30 has a lower end 90 that is provided with a rigid member 170. According to the invention, the rigid member 170 is securely fitted within the interior slots 123 of the tracks 120 and secures the sun screen 30 thereto.

As is well known to most automobile drivers, each automobile comes with a factory-installed rear view mirror that is generally mounted on the windshield. Unfortunately, mounting the rear view mirror to the windshield obstructs the sun screen 30 from being lowered beyond the location of the rear view mirror. As a result, to use the present invention the factory-installed rear view mirror must be removed from the windshield. As shown in FIG. 2, a rear view mirror 70 is mounted to the housing, extending downward therefrom, so that the factory-installed rear view mirror may be removed from the windshield. Accordingly, when the housing is mounted to the ceiling of the automobile, the rear view mirror extends to a position where it provides a rearward view to the driver of the automobile. The rear-view mirror 70 thus ensures that the driver can have a clear view of the traffic behind the automobile despite installation of the sunshade 5 of the present invention, and removal of the factory-installed rear view mirror.

The sun screen 30 is tinted to substantially block sun light from entering into the automobile from the front windshield. According to the invention, the sun screen 30 may be selectively raised or lowered to allow usage of the sunshade 5 as a visor or as a sun shield. To use the sun screen 30 as a visor, it is envisioned that the sun screen 30 will be lowered to approximately a quarter of the windshield. On the other hand, the sun screen 30 is lowered completely to cover the entire windshield and block sun light from entering into the interior when the automobile is parked.

As show in FIG. 3, a battery 40 is connected to the motor 50 within the housing 10, wherein the battery 40 provides the electrical power necessary for operation of the motor 50. A switch 43 is connected to the motor 50, such that activating the switch 43 causes rotation of the motor 50. According to the invention, the switch 43 allows the user to reverse the motor, so as to selectively rotate the motor 50 in a clockwise or a counter clockwise direction, and thereby deploy or retract the sun screen 30.

As noted above, one end of the sun screen 30 is mounted to the motor 50. As a result, rotation by the motor 50 causes the sun screen 30 to be appropriately lowered or raised. The motor 50 has a sun screen sensor 47, which halts clockwise rotation by the motor 50 when the sun screen 30 is fully lowered onto the windshield, and detects the proximity of the rigid member 90 to halt counter clockwise rotation by the motor 50 when the sun screen 30 is fully raised from the windshield.

Many specific details contained in the above description merely illustrate some preferred embodiments and should not be construed as a limitation on the scope of the invention. Accordingly, many other variations are possible within the true spirit of the present invention.

What is claimed is:

1. A sunshade, for attached to an automobile having a windshield, an interior, and a ceiling, comprising:

a housing, the housing is mountable to the ceiling of the automobile, the housing having a slit adjacent to the windshield;

a motor, located within the housing;

a sun screen, having a rigid member at one end, and linked to the motor at an opposite end, the sun screen selectively retracts into the housing under power of the motor and selectively deploys outward from the slit in the housing;

a pair of tracks, is mountable alongside the windshield having interior slots for guiding the rigid member of the sun screen, and thereby allowing the sun screen to extend across the windshield;

an idler, located within the housing adjacent to the slit, the idler engaging the sunscreen to guide motion of the sunscreen as it is deployed and retracted; and a rear view mirror, mounted to the housing, and extending downward therefrom, for providing a rearward view to a driver of the automobile.

2. A sunshade, for attached to an automobile having a windshield, an interior, and a ceiling, comprising:

a housing, the housing is mountable to the ceiling of the automobile, the housing having a slit adjacent to the windshield;

a motor, located within the housing;

a sun screen, having a rigid member at one end, and linked to the motor at an opposite end, the sun screen selectively retracts into the housing under power of the motor and selectively deploys outward from the slit in the housing; and a pair of tracks, mounted alongside the windshield, having interior slots for guiding the rigid member of the sun screen, and thereby allowing the sun screen to extend across the windshield.

3. The sun screen as recited in claim 2, further comprising a rear view mirror, mounted to the housing, and extending downward therefrom, for providing a rearward view to a driver of the automobile.

4. The sun screen as recited in claim 2, further comprising a idler, located within the housing adjacent to the slit, the idler engaging the sunscreen to guide motion of the sunscreen as it is deployed and retracted.

5. The sun screen as recited in claim 4, further comprising a switch for causing the motor to selectively rotate clockwise and counterclockwise to selectively deploy and retract the sun screen into the housing.

\* \* \* \* \*